United States Patent
Yi et al.

(10) Patent No.: US 8,086,070 B2
(45) Date of Patent: Dec. 27, 2011

(54) IMAGE PROCESSING APPARATUS USING ALPHA PLANE AND METHOD THEREOF

(75) Inventors: Young-Pum Yi, Suwon-si (KR); Byeungwoo Jeon, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 176 days.

(21) Appl. No.: 12/606,587

(22) Filed: Oct. 27, 2009

(65) Prior Publication Data

US 2010/0039442 A1 Feb. 18, 2010

Related U.S. Application Data

(62) Division of application No. 11/399,193, filed on Apr. 6, 2006, now Pat. No. 7,630,577.

(30) Foreign Application Priority Data

Apr. 7, 2005 (KR) .................. 10-2005-0029069

(51) Int. Cl.
 *G06K 9/36* (2006.01)
(52) U.S. Cl. ...................... 382/276; 345/592
(58) Field of Classification Search .............. 345/549, 345/581, 589, 592; 382/162, 276
 See application file for complete search history.

(56) References Cited

U.S. PATENT DOCUMENTS

| | | | |
|---|---|---|---|
| 5,768,438 A | 6/1998 | Etoh | |
| 6,512,856 B1 * | 1/2003 | Davis | 382/284 |
| 6,697,531 B2 | 2/2004 | Yamaguchi et al. | |
| 6,927,778 B2 | 8/2005 | Aleksic et al. | |

FOREIGN PATENT DOCUMENTS

| | | | |
|---|---|---|---|
| JP | 10023434 A * | 1/1998 | |
| JP | 2000-324501 | 11/2000 | |
| JP | 2003-023633 | 1/2003 | |
| JP | 2004-023332 | 1/2004 | |
| KR | 2004010956 A * | 2/2004 | |

OTHER PUBLICATIONS

"Image Processing Appratus Using Alpha Plane and Method Thereof" Specification, Drawings, and Prosecution History of U.S. Appl. No. 11/399,193, filed Apr. 6, 2006, by Young-Pum Yi, et al., which is stored in the United States Patent and Trademark Office (USPTO) Image File Wrapper (IFW) system.

* cited by examiner

*Primary Examiner* — Gregory F Cunningham
(74) *Attorney, Agent, or Firm* — Onello & Mello, LLP

(57) ABSTRACT

In an image processing apparatus and method, image data includes both color and alpha components. During processing, only the color component of the image data is stored in a memory. Display image data are then generated in response to the color component data retrieved from the memory and the alpha component data that were not stored in the memory. In this manner, by not storing the alpha component data in the memory, the memory access load by the image processing system is reduced.

14 Claims, 11 Drawing Sheets

IMAGE PROCESSING APPARATUS USING ALPHA PLANE AND METHOD THEREOF

CROSS-REFERENCE TO RELATED APPLICATIONS

This application is a divisional application of U.S. patent application Ser. No. 11/399,193, filed on Apr. 6, 2006, which relies for priority upon Korean patent application number 10-2005-0029069, filed on Apr. 7, 2005, in the Korean Intellectual Property Office, the contents of which applications are incorporated herein in their entirety by reference.

BACKGROUND OF THE INVENTION

The subject matter disclosed herein is concerned with image processing technologies. In particular, the subject matter disclosed herein relates to an image processing apparatus and method thereof, managing image data using alpha plane.

In displaying image data on liquid crystal display (LCD) units, cathode ray tubes (CRT), or digital televisions, image data is commonly retrieved from frame memory devices.

FIG. 1 is a block diagram of a conventional image display system for processing image data.

As shown in FIG. 1, an image display system includes a central processing unit controller 110, an image processor 120, a memory 130, a display processor 140, and a monitor 150.

The image processor 120 receives and processes input image data INDATA in response to instructions from the controller 110. The processed image data include color and alpha components. The image processor 120 further stores the image data in the memory 130. The display processor 140 retrieves the stored image data from the memory 130 and then transfers the output image data OUTDATA to the monitor 150.

With the advancement of image data processing technologies, the degree of image resolution continues to increase, placing additional burden on image data processing speed, as well as requiring additional memory storage capacity. In particular, an image processing system is commonly burdened with operations for writing/retrieving image data to/from the memory within a restricted bandwidth. In an effort to overcome bandwidth limitations, there have been a number of proposed techniques for compressing/restoring images. Technology for compressing/restoring image data commonly employ approaches for compressing and restoring image data using features among pixels or among pixel groups, and displaying them. However, such conventional approaches for image compression/restoration are regarded as being unreliable because compression rates thereof are variable over a large range of features of image data. In addition, distortion errors can be generated between source image data and restored image data. Further, relatively complex hardware architectures are required for the compression function.

SUMMARY OF THE INVENTION

The present invention is directed to image processing apparatus and methods that improve the efficiency of the image data processing function in a relatively simple architecture.

The invention is also directed to image processing apparatus and methods that display image data without distortion of source image data.

In one aspect, the present invention is directed to an image processing apparatus comprising: a first processor block that generates color and alpha component data from image data; a memory that stores the color component data generated by the first processor block; and a second processor block that generates display image data in response to the color component data retrieved from the memory and the alpha component data received from the first processor block.

In one embodiment, the apparatus further comprises a bus that transfers the color component data among the memory, the first processor block, and the second processor block.

In another embodiment, image data processed in a frame includes at least two different alpha component data.

In another embodiment, the two different alpha component data are distributed in alpha component regions.

In another embodiment, the first processor block provides the second processor block with positional information of the alpha component data corresponding to the alpha component regions.

In another embodiment, the second processor block generates the displaying image data with reference to the color component data, the alpha component data, and the positional information of the alpha component data.

In another embodiment, the memory is one of an SDRAM and a DDR SDRAM.

In another aspect, the present invention is directed to an alpha data selector for an image processing apparatus, comprising: comparing units, each comparing unit corresponding to one of a plurality of alpha component regions of an image, each comparing unit receiving a positional information signal of alpha component data and information of a current pixel position and generating a comparison signal that indicates whether the current pixel position is included within a corresponding alpha component region; and an alpha data output unit generating one of the alpha component data as alpha component data of the current pixel in response to the comparison signals generated by the comparing units, wherein the comparing units are arranged to have relative priority and the alpha data output unit selects the alpha component data of the current pixel with reference to the priorities of the comparing units.

In one embodiment, when a first alpha component region having first alpha component data is included in a second alpha component region having second alpha component data, the first alpha component data is selected as alpha component data of the first alpha component region.

In another embodiment, when a first alpha component region having first alpha component data partially overlaps with a second alpha component region having second alpha component data, alpha component data corresponding to an activated region of the first and second alpha component regions is selected as alpha component data of the overlapping region.

In another embodiment, when the alpha component data in a frame can be determined in the form of mathematical function, the alpha component data of the current pixel is output.

In another aspect, the present invention is directed to an image processing apparatus comprising: an image processor that processes image data and that outputs color component data of the image data to a memory; a control processor that controls operations of the image processor, and that outputs alpha component data of the image data and positional information that represents a distribution profile of alpha component data of the image data, generated by the image processor, when the alpha component data has a predetermined distribution profile; an alpha data selector that outputs alpha component data, corresponding to a current pixel position, with reference to the alpha component data and the positional information that are provided by the control processor; and a display processor that outputs display image data of the current pixel in response to the color component data retrieved from the memory and the alpha component data received from the alpha data selector.

In one embodiment, the apparatus further comprises a bus that transfers the color component data among the memory, the image processor, and the display processor.

In another embodiment, the display processor provides the current pixel position for the alpha data selector.

In another embodiment, image data processed in a frame includes at least two different alpha component data.

In another embodiment, the two different alpha component data are distributed in alpha component regions.

In another embodiment, the control processor block provides the alpha data selector with positional information of the alpha component data corresponding to the alpha component regions.

In another embodiment, the alpha data selector sets the first alpha component data as alpha component data of the first alpha component region when a first alpha component region having first alpha component data is included in a second alpha component region having second alpha component data.

In another embodiment, the alpha data selector sets alpha component data corresponding to an activated region of the first and second alpha component regions as alpha component data of the overlapping region when a first alpha component region having first alpha component data partially overlaps with a second alpha component region having second alpha component data.

In another embodiment, the alpha data selector comprises: comparing units, each unit corresponding to one of plurality of alpha component regions of an image, each comparing unit receiving a positional information signal of alpha component data and information of a current pixel position and generating a comparison signal that indicates whether the current pixel position is included within a corresponding alpha component region; and an alpha data output unit generating one of the alpha component data as alpha component data of the current pixel in response to the comparison signals generated by the comparing units, wherein the comparing units are arranged to have relative priority and the alpha data output unit selects the alpha component data of the current pixel with reference to the priorities of the comparing units.

In another embodiment, the control processor block provides the comparing units of the alpha data selector with a plurality of positional information of the alpha component data corresponding to the alpha component regions in accordance with priorities.

In another aspect, the present invention is directed to a method of processing image data, comprising: processing input image data; storing color component data of the processed image data in a memory and outputting alpha component data; retrieving the color component data from the memory; and generating display image data from the retrieved color component data and the alpha component data.

In another aspect, the present invention is directed to a method of processing image data, comprising: processing input image data; storing color component data of the processed image data in a memory and outputting alpha component data and positional information representing a distribution profile of the alpha component data; retrieving the color component data from the memory; and generating display image data from the retrieved color component data, the alpha component data, and positional information.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention. In the drawings.

DETAILED DESCRIPTION OF EMBODIMENTS OF THE INVENTION

The present invention will now be described more fully hereinafter with reference to the accompanying drawings, in which preferred embodiments of the invention are shown. This invention may, however, be embodied in different forms and should not be construed as limited to the embodiments set forth herein. Like numbers refer to like elements throughout the specification.

Figure 1:
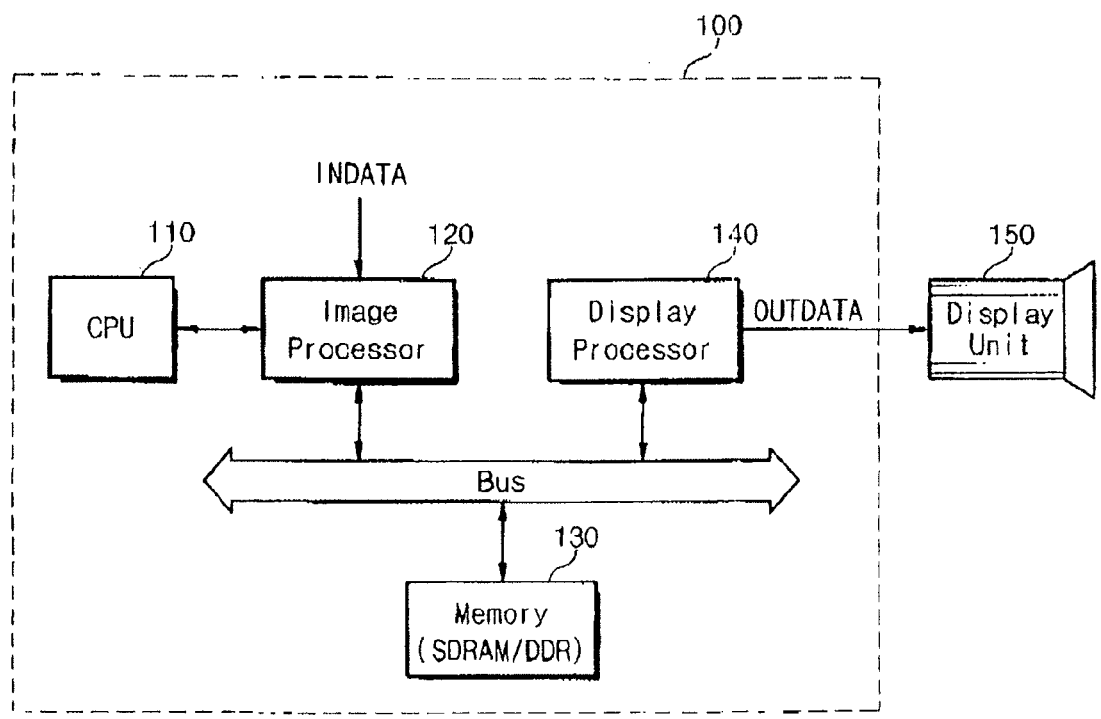
FIG. 1 is a block diagram of a conventional image display system for processing image data.
Figure 2:
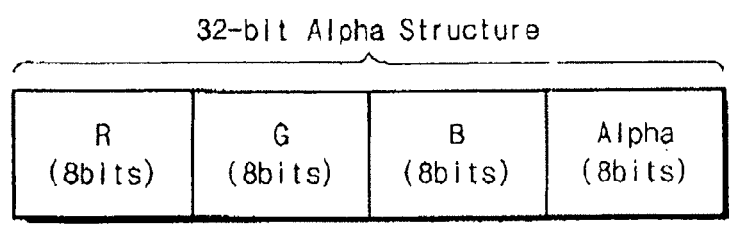
FIG. 2 is a schematic diagram showing a data structure of image data.

FIG. 2 is a schematic diagram showing a data structure of image data. Image data in each of pixels composing a image contain a color component constituted of three units—red (R), green (G), and blue (B), and an alpha component representing transparency. For example, an image data can comprise 32 bits when the color component is composed of 24 bits, i.e., 8 bits for each color unit, and the alpha component is composed of 8 bits. In contemporary systems, the image data is processed at a data rate of 216 Mbytes/sec in processing a graphic image of 32 bit data at a frame frequency of 60 Hz when the resulting display resolution is 1280*720. Recently, increases in the resolution of display devices have further increased the quantity of data that must be processed within a give time period.

Figure 3:
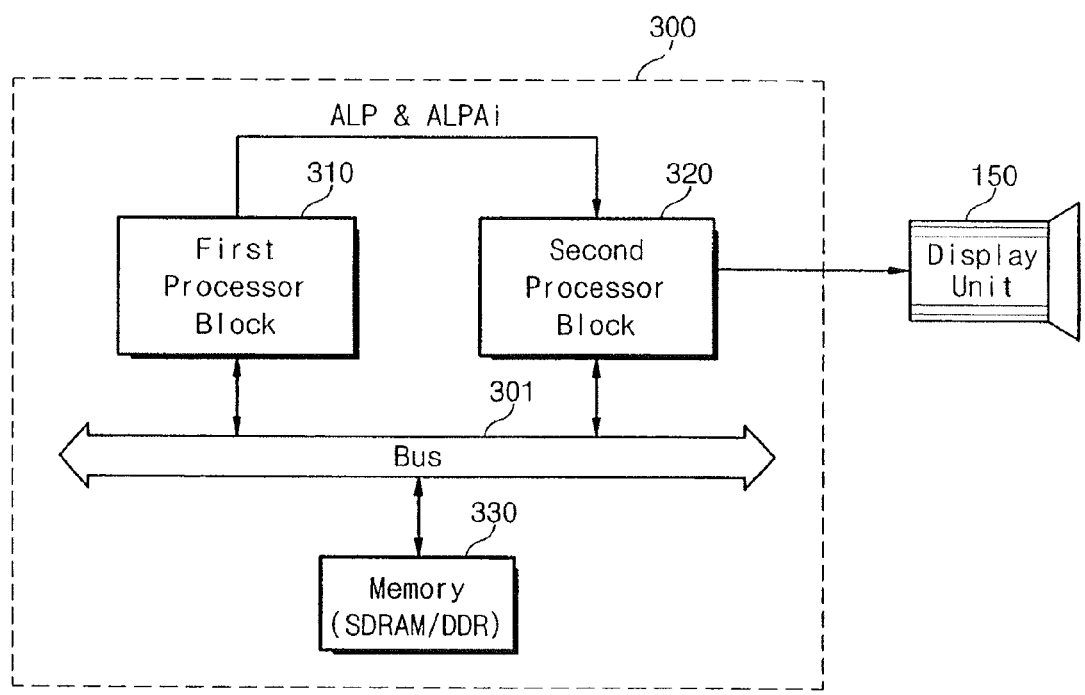
FIG. 3 is a block diagram illustrating an image processing apparatus in accordance with an embodiment of the invention.
Figure 7:
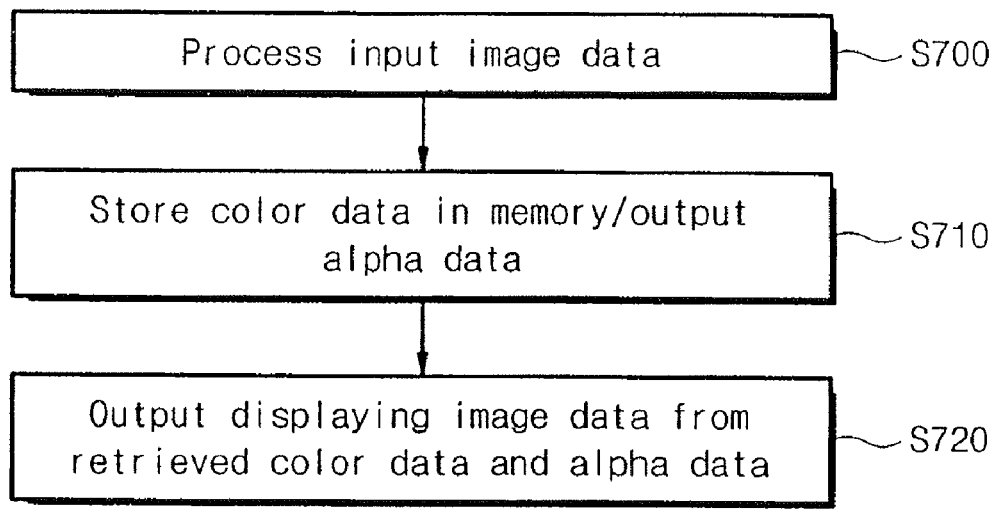
FIG. 7 is a flow diagram of a method of operation in the image processing apparatus shown in FIG. 3.

FIG. 3 is a block diagram illustrating an image processing apparatus 300 in accordance with an embodiment of the invention, and FIG. 7 is a flow diagram of a method of operation in the image processing apparatus 300 shown in FIG. 3. Referring to FIG. 3, the image processing apparatus 300 comprises a first processor block 310, a second processor block 320, a bus 301, and a memory 330. The image processing apparatus 300 transfers output image data to a display unit 150 after conducting a signal processing operation on received input image data.

Referring to FIG. 7, the first processor block 310 performs a predetermined signal processing operation with the input image data (step S700). The processed image data contains both color and alpha components. If the alpha component of the processed image data has a predetermined distribution profile, the first processor block 310 stores the color component of the processed image data into the memory 330 via the bus 301 and provides the alpha component of the processed image data to the second processor block 320 (step S710).

The second processor block 320 transfers the output image data to the display unit 150 on basis of the alpha component provided from the first processor block 310 and the color component retrieved from the memory 330 (step S720).

The memory 330 has a capacity that is capable of storing image data that corresponds to at least one frame of data. For example, the memory 330 can comprise a synchronous DRAM (SDRAM) or a double data rate SDRAM. The first and second processor blocks, 310 and 320, store and retrieve the image data to and from the memory 330 via the bus 301.

As discussed above, in contemporary systems, the image data processing efficiency is lowered due to limitations on bus bandwidth while the quantity of data to be processed continues to increase in accordance with increased display resolution and increased data size for each pixel. Therefore, the image data processing apparatus of the present invention stores just a portion of the image data, i.e., only the color component, in the memory 330, which reduces the burden on the bus 301 and the burden on memory 330 access while conducting the image processing operation, and provides the alpha component of the data directly to the second processor block 320.

When an image data element is composed of 32 bits with 24-bit color component and 8-bit alpha component, the amount of bus traffic in the image processing apparatus 300 of the invention is decreased by a maximum of about 25%.

Figure 5A:
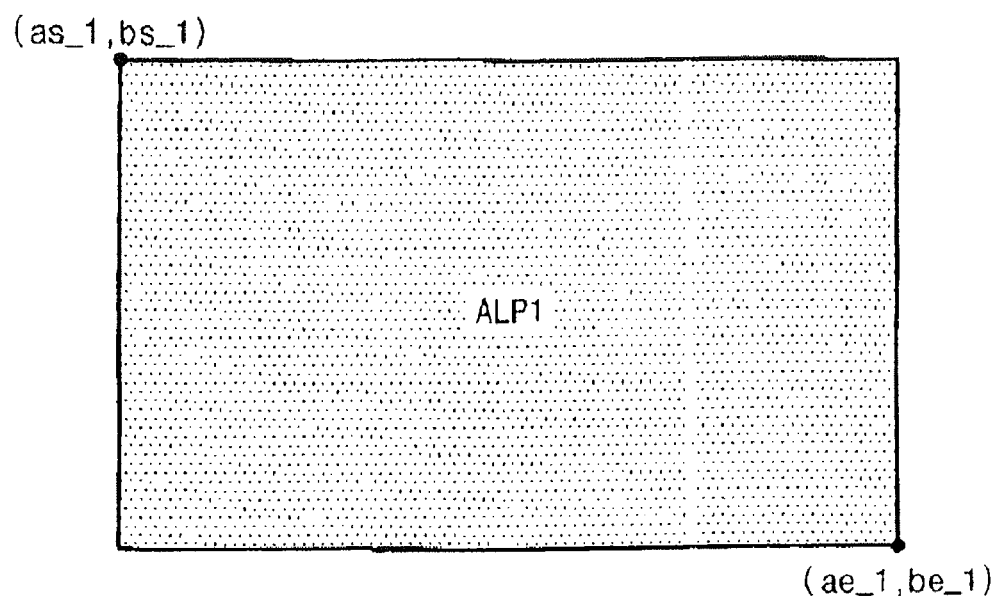
FIGS. 5A through 5K are schematic diagrams exemplarily illustrating features of images having various distribution profiles of alpha data components in a frame.

FIGS. 5A through 5K exemplarily illustrate graphic images having various distribution profiles of alpha data components in a frame. The blocked structure of the image processing apparatus 300 shown in FIG. 3 may be applicable to the case of the uniform transparency (i.e., the uniform distribution profile of the alpha components) in a frame as shown in FIG. 5A, in which the first processor block 310 functions to provide the alpha component only to the second processor unit. Otherwise, if a frame includes more two types of alpha components that are different in distribution profile, therein as illustrated FIGS. 5B through 5K, the first processor block 310 transfers information corresponding to the alpha components, as well as each alpha component itself, to the second processor block 320.

Figure 5B:
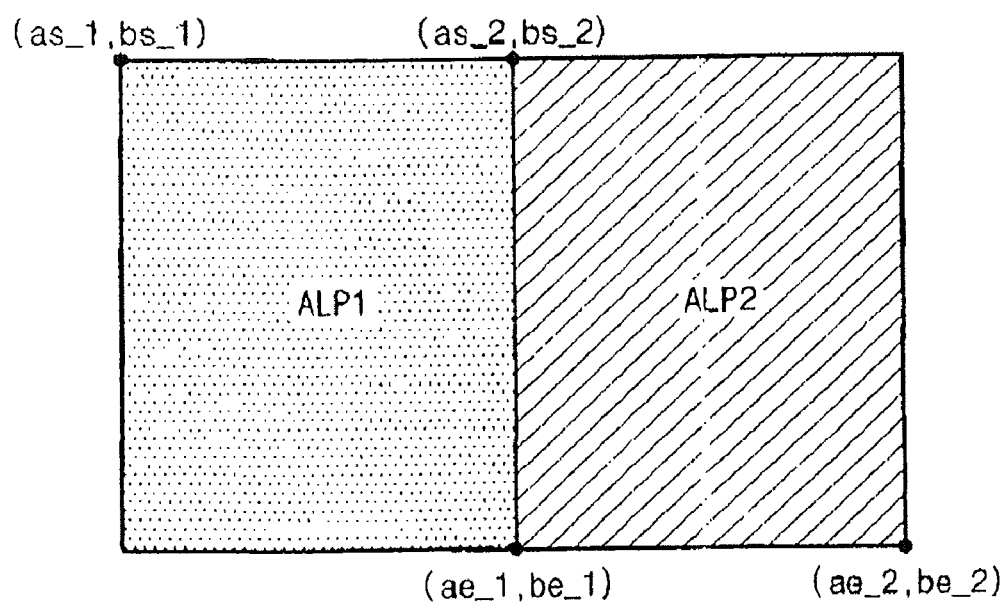
Figure 5C:
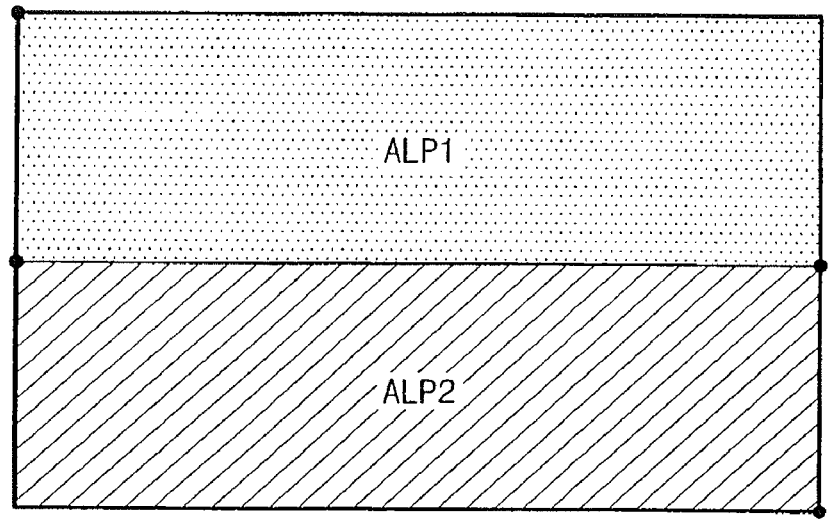
Figure 5D:
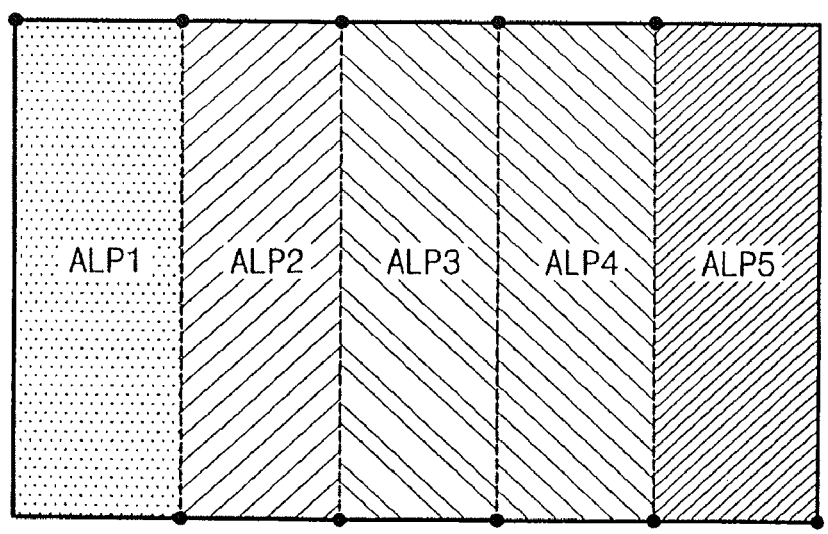
Figure 5E:
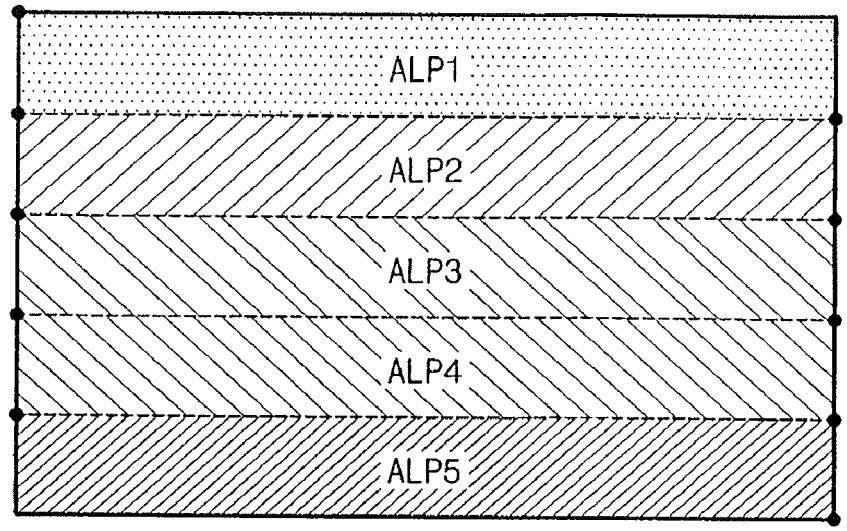
Figure 5F:
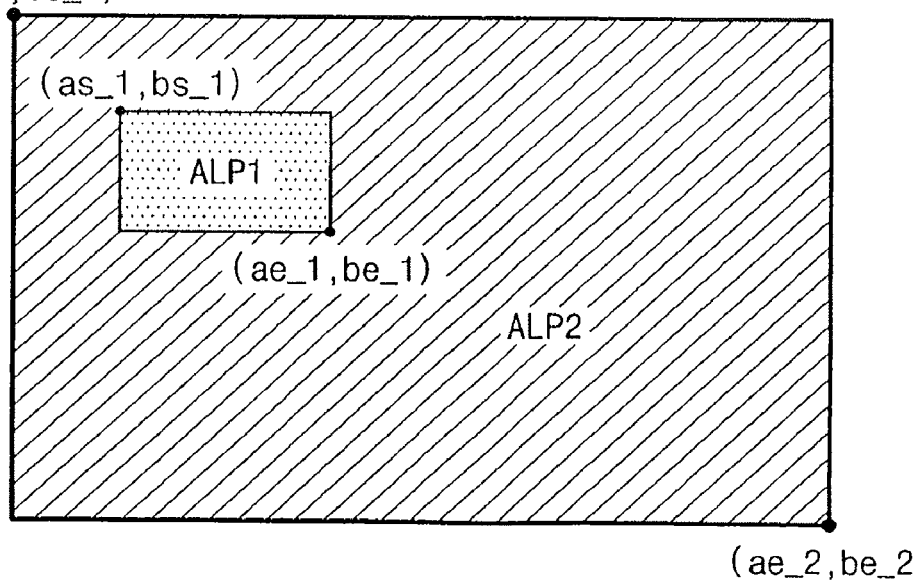

In analyzing the distribution profiles of alpha components of an graphic image, it is usual in most cases to determine the same pattern of alpha components in every rectangular field as shown in FIG. 5F. Therefore, if the distribution profile of the alpha components therein are known, the memory access burden can be lessened by storing the color components only of the image data in the memory and re-combining the color components with the alpha components in accordance with the positions of pixels to be displayed.

Figure 4:
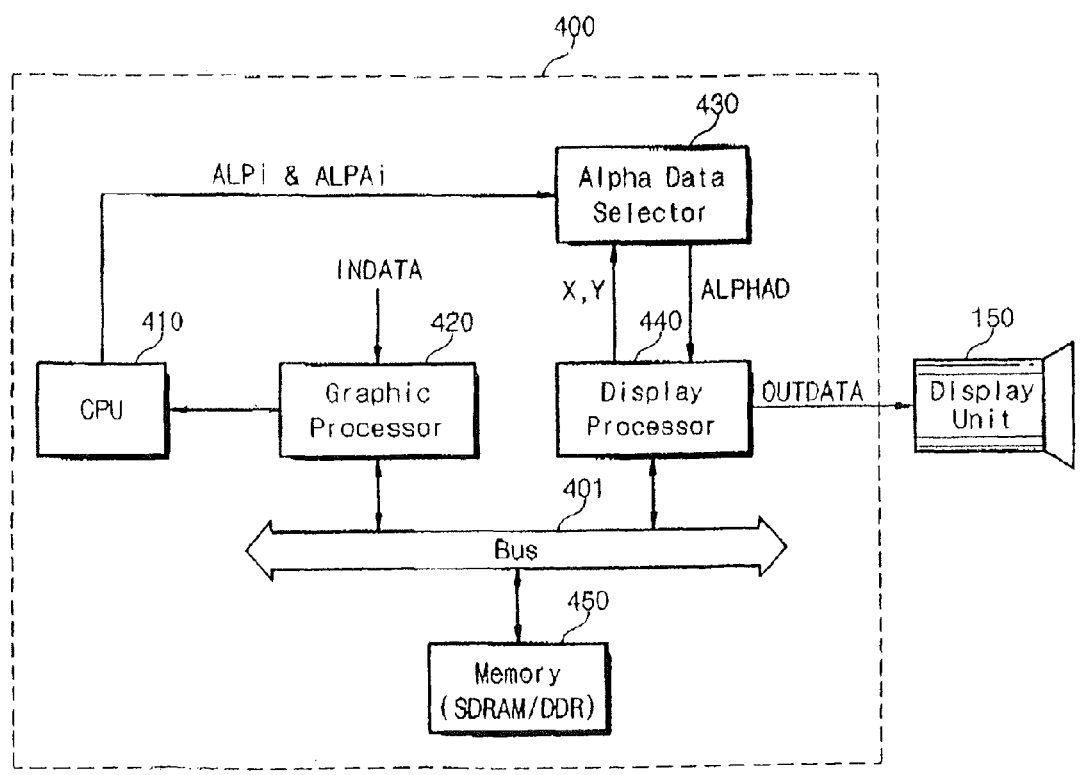
FIG. 4 is a block diagram illustrating an image processing apparatus in accordance with another embodiment of the invention.
Figure 8:
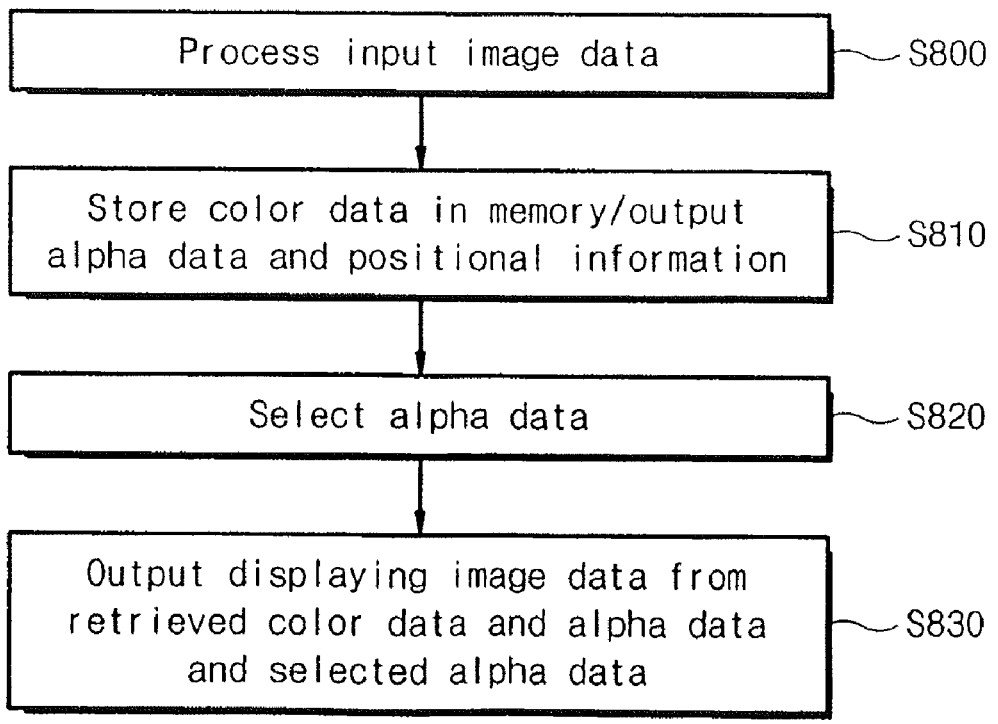
FIG. 8 is a flow diagram a method of operation in the image processing apparatus shown in FIG. 4.

FIG. 4 illustrates an image processing apparatus 400 in accordance with another embodiment of the invention, and FIG. 8 is a flow diagram of a method of operation in the image processing apparatus 400 shown in FIG. 4. The image processing apparatus 400 shown in FIG. 4 is comprised of a bus 401, a central processing unit (CPU) 410 as a control processor, a graphic processor 420, an alpha data selector 430, a display processor 440, and a memory 450. The image processing apparatus 400 can further include an optional MPEG circuit in addition to the circuit elements shown in FIG. 4. Referring to FIG. 8, the graphic processor 420 processes input image data INDATA under control of the CPU 410 (step S800). The processed image data includes color and alpha components. The graphic processor 420 stores the color component in the memory 450 via bus 401 and outputs the alpha component therefrom. During this, when the alpha component of the data processed by the image processor 420 has a predetermined distribution profile, the alpha data selector 430 is provided with an alpha component data ALPi and positional information ALPAi that represents a distribution profile of the alpha components corresponding thereto (step S810).

The alpha data selector 430 compares positional information corresponding to a current pixel, having an X and Y position, which is provided from the display processor 440, with the positional information provided by the CPU 410, and then provides the alpha component data ALPHAD to the display processor 440 in correspondence with a result of the comparison (step S820). The display processor 440 outputs the output image data OUTDATA to the display unit 150 with reference to the alpha component data ALPHAD provided from the alpha data selector 430 and a color component of a current pixel retrieved from the memory 450 (step S830).

Examples of various alpha component regions adaptively depicted on the display unit 150 of FIG. 4 are shown throughout FIGS. 5A through 5K.

As illustrated in FIG. 5A, if the alpha components of image data are the same in all pixels of a frame, the alpha component data ALPi and the positional information ALPAi, which are provided from the CPU 410 to the alpha data selector 430, are each generated in a single data element. That is, the CPU 410 provides a coordinate value [as_1, bs_1] of the first pixel and a coordinate value [ae_1, be_1] of the last pixel, of the alpha component region having the same alpha component value, to the alpha data selector 430.

Meanwhile, as illustrated in FIG. 5B through 5K, if alpha component data of the pixels in a frame is composed of plural bits and distribution profiles of the alpha components can be recognized in a mathematical function, the CPU 410 provides the alpha data selector 430 with a plurality of the alpha component data ALPi distributed in the frame and a plurality of the alpha-component positional information ALPAi corresponding thereto.

For instance, as shown in FIG. 5B, if a frame includes two alpha component regions, the CPU 410 provides the alpha data selector 430 with alpha data ALP1 and ALP2 of the two regions, coordinate values [as_1, bs_1] and [as_2, bs_2] of the first pixel, and coordinate values [ae_1, be_1] and [ae_2, be_2] of the last pixel of each region. The alpha data selector 430 compares the pixel coordinate values which correspond to the positional information of the alpha component provided by the CPU 410, with a coordinate value [X, Y] of a current pixel, and then outputs alpha component data ALPHAD corresponding to either of the two alpha component data ALP1 and ALP2 in accordance with the region in which the current pixel is located. The display processor 440 generates the output image data OUTDATA for the current pixel on the basis of the alpha component data ALPHAD received from the alpha data selector 430 and the color component data corresponding to that pixel retrieved from the memory 450.

The graphic image shown in FIG. 5C may be processed by combining color and alpha components in a manner similar to the method illustrated in FIG. 5B. FIGS. 5D and 5E are examples of graded transparency in a frame. The images depicted in FIGS. 5D and 5E may be restored into their source images by combining color and alpha components as similar to the method illustrated above with reference to FIG. 5B.

FIGS. 5F through 5K exemplarily show graphic images where alpha component regions overlap with each other. The most general pattern of overlapping the alpha component regions is, as shown in FIG. 5F, determined in a rectangular form. In this case, although the region of the alpha component data ALP1 is encompassed by the region of the alpha component data ALP2, the value of alpha component data in that region is ALP1. In other words, the alpha component data of each pixel within the overlapped region are determined in accordance with priority. In the example graphic images shown in FIGS. 5G through 5J, the alpha component data ALP1 is higher in priority than the alpha component data ALP2.

In selecting alpha component data for the graphic image shown in FIG. 5F, the first and last coordinates of the alpha component data ALP1, the first and last coordinates of the alpha component data ALP1, and the alpha component data for each region are sufficient for identifying the alpha component data of each pixel on the image.

Figure 5G:
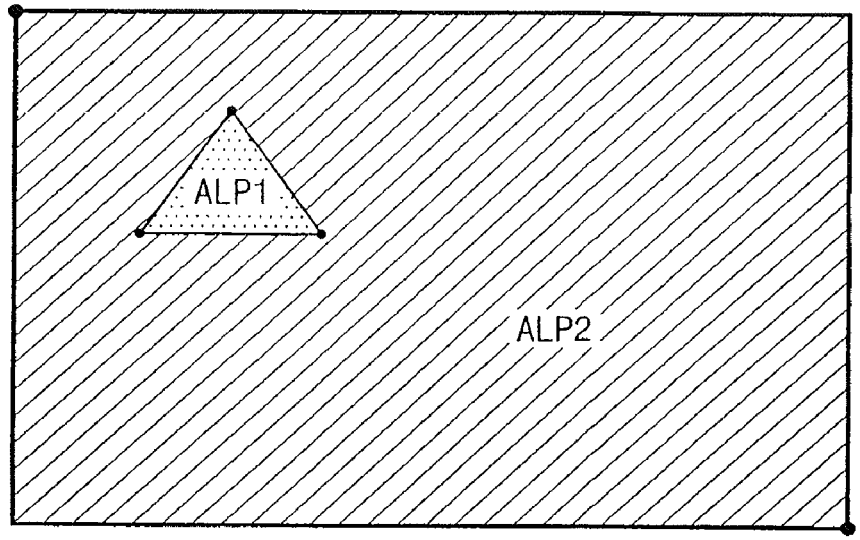
Figure 5H:
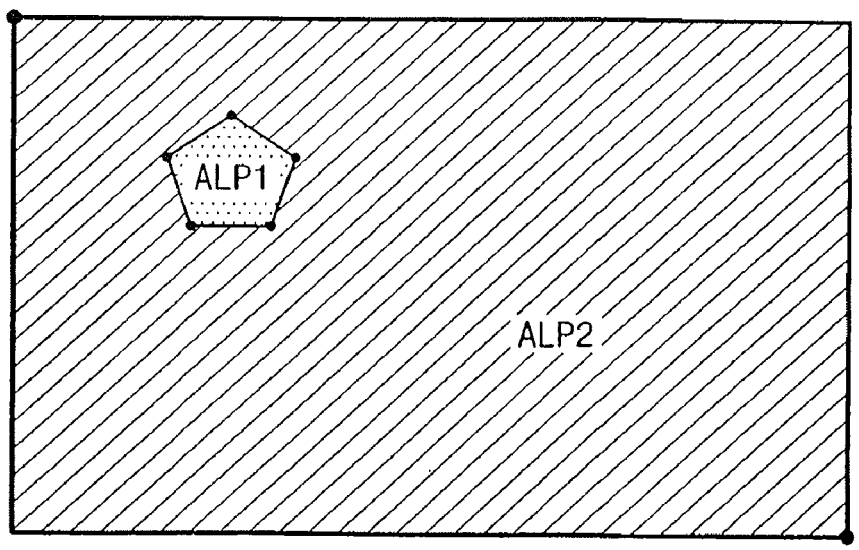
Figure 5I:
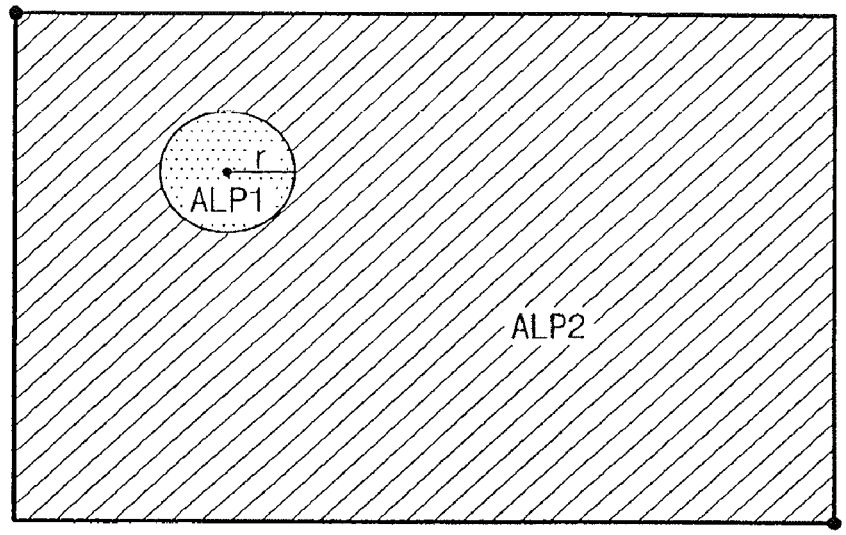
Figure 5J:
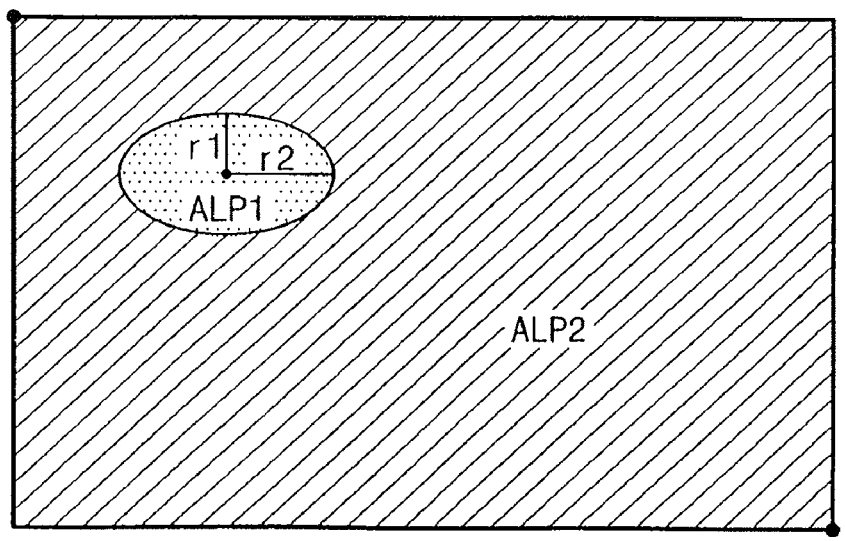

The triangular region shown in FIG. 5G is defined by pixel coordinate values positioned at three points and the pentagonal region shown in FIG. 5H is defined by pixel coordinate values positioned at five points. The circular region shown in FIG. 5I is defined by a central coordinate value and a radius r and the elliptical region shown in FIG. 5J is defined by a central coordinate value and radii r1 and r2. As such, if alpha components distributed in a frame can be described in the form of a mathematical function, image data can be partitioned into the color and alpha components and only the partitioned color component is stored in the memory 450 shown in FIG. 4. Under this arrangement, the color component retrieved from the memory 450 can be re-combined with the corresponding alpha component, thereby generating output image data for display.

Figure 5K:
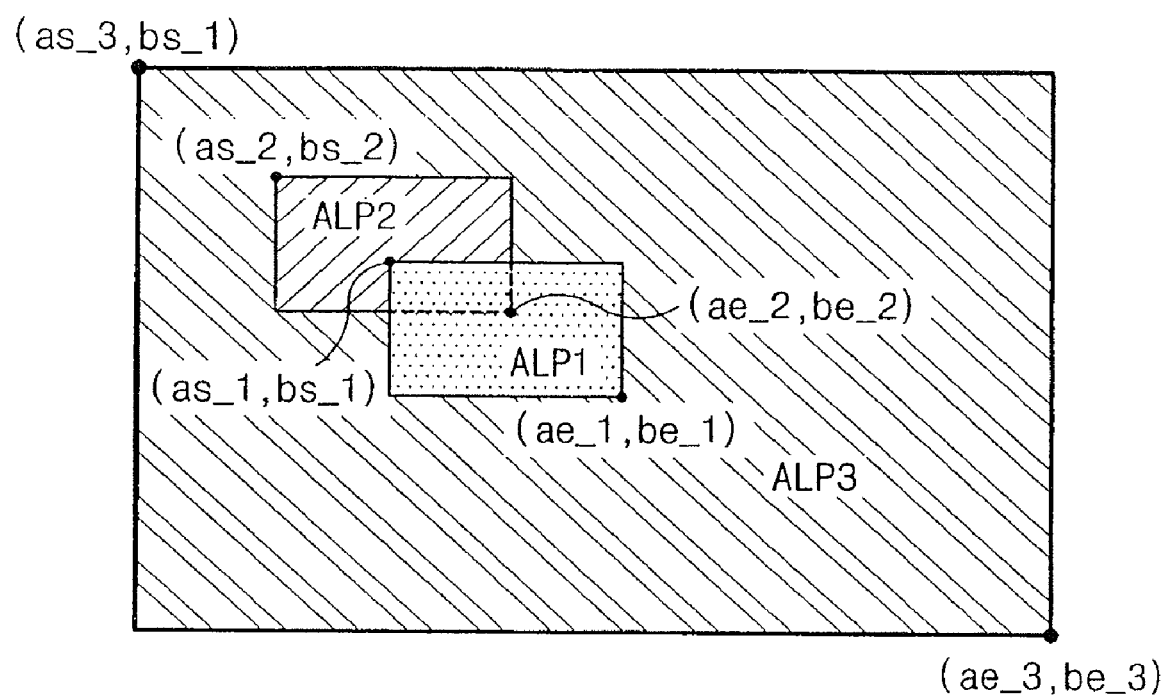

FIG. 5K exemplarily shows a graphic image in the case an overlap between two alpha component regions and including three types of alpha components within a frame.

In processing the alpha component data of the image shown in FIG. 5K, the positional information of alpha component data ALP1, [as_1, bs_1] and [ae_1, be_1], positional information of alpha component data ALP2, [as_2, bs_2] and [ae_2, be_2], and positional information of alpha component data ALP3, [as_3, bs_3] and [ae_3, be_3] are required. In this case, the alpha component data are ordered in the sequence of ALP1, ALP2, and ALP3 in priority.

Figure 6:
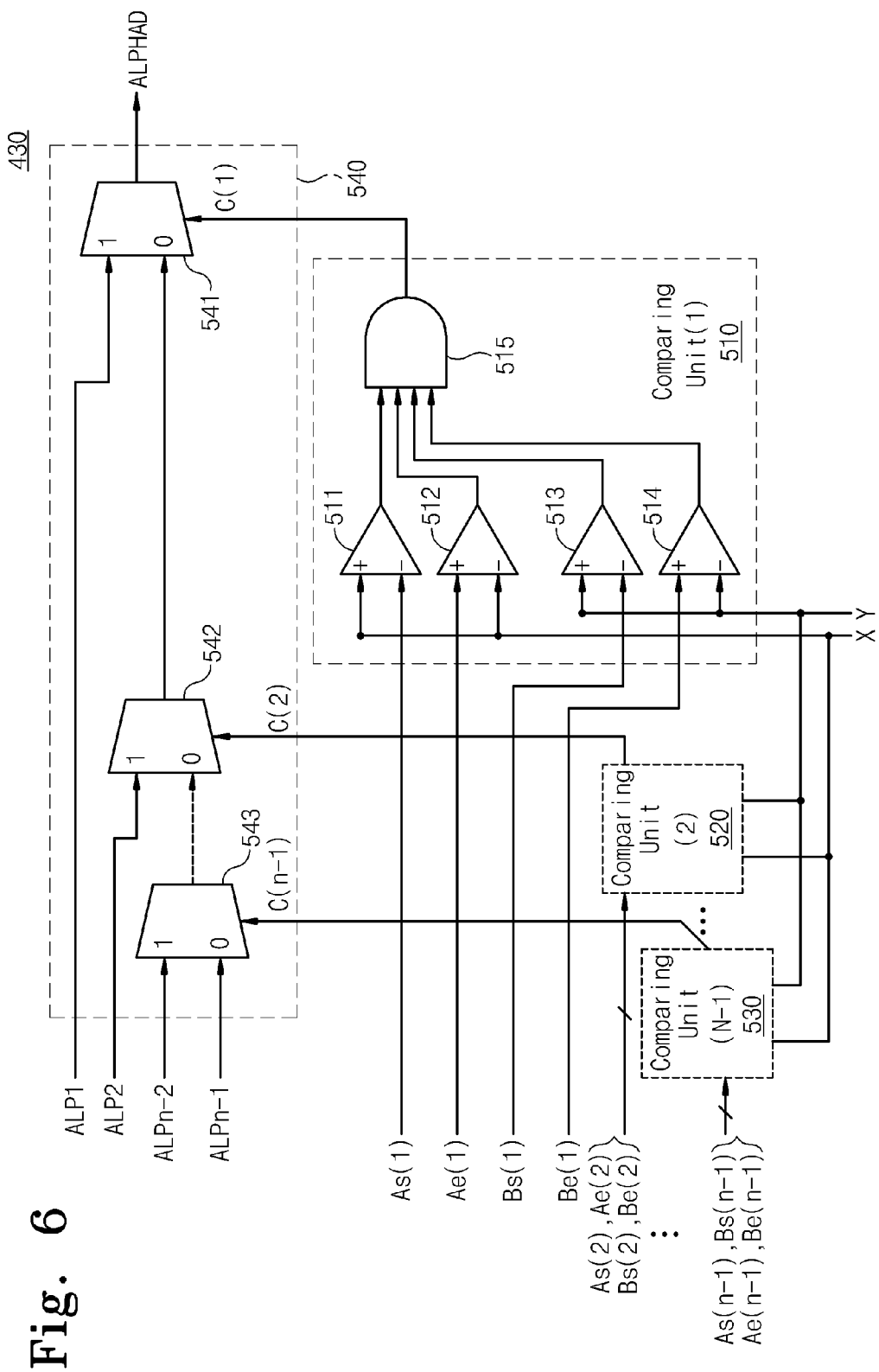
FIG. 6 is a circuit diagram illustrating a detailed configuration of the alpha data selector shown in FIG. 4.

FIG. 6 is a circuit diagram illustrating a detailed configuration of the alpha data selector 430 shown in FIG. 4. The alpha data selector 430 includes comparing units 510, 520, 530 and alpha data-selection unit 540. The comparing units 510, 520, 530 receive the positional information signals ALPAi provided from the CPU 410, for example in the form of the first and last pixel coordinate values [As(i), Bs(i)] and [Ae(i), Be(i)], and output comparison signals C(1) ... C(n−1) for determining whether a current position provided by the display processor 440 belongs to the alpha component region.

While the comparing units 510, 520, 530 have the same circuit construction as each other, their respective priorities are arranged from 310 to 330 in descending order. Thus, the CPU 410 provides the information of the respective alpha component regions for the comparing units in accordance with the priority order.

For example, as illustrated in FIG. 5K, while the pixels located between the coordinates [as_1, bs_1] and [as_2, bs_2] belong to all of the alpha component regions ALP1, ALP2, and ALP3, their own alpha component data is ALP1. Therefore, the coordinate information of the alpha component data ALP1 is provided to the comparing unit 510, and the coordinate information of the alpha component data ALP2 is provided to the comparing unit 520. And, the coordinate information of the alpha component data ALP3 is provided to the comparing unit 530.

Each comparing unit 510 includes comparators 511, 512, 513, 514 and an AND gate 515. The comparators 511 and 512 compare the horizontal coordinate value X of the current pixel with the horizontal coordinate values as_1 and ae_1 of the alpha component region, and thereby determine whether the horizontal coordinate value X of the current pixel is included within the alpha component region. The comparators 513 and 514 compare the vertical coordinate value Y of the current pixel with the vertical coordinate values bs_1 and be_1 of the alpha component region, and thereby determine whether the vertical coordinate value Y of the current pixel is included within the alpha component region. The AND gate 515 activates the comparison signal C(1) when the current pixel coordinate [X,Y] is located within the alpha component region.

As described above, the comparing units 510, 520, 530 operate according to relative priority. The alpha data-selection unit 540 outputs one of the alpha component data ALP1 ... ALPn as the alpha component data ALPHD to be displayed, in response to the comparison signals C(1) ... C(n−1) generated at the comparing units 510 ... 530, selecting the alpha component data ALPHD with reference to the priority of the comparing units 510 ... 530.

In other words, when the comparison signals C(1) ... C(n−1) generated by the comparing units 510 ... 530 are all activated, the alpha data-selection unit 540 designates the alpha component data ALP1, which corresponds to the comparing unit 510 having the highest priority, as the alpha component data ALPHD to be displayed. As such, in the case where two or more comparison signals are active, the alpha data-selection unit 540 sets the alpha component data ALPHD to the alpha component data corresponding to the highest-priority comparing unit. The alpha data-selection unit 540 in an embodiment of the invention further comprises multiplexers 541 ... 543 each corresponding to one of the comparing units 510 ... 530.

Although the alpha data selector according to the above described embodiment of FIG. 6 is configured to select alpha component data of a current pixel with reference to the first and last pixel coordinate values of a corresponding alpha component region when the alpha component region is rectangular, the circuit can also be configured for comparing coordinates of alpha component regions that can be determined in mathematical functions such as polygons, circles, or ellipses as shown in FIGS. 5G through 5J.

When the CPU 410 of FIG. 4 determines that a distribution profile of alpha components in a frame cannot be determined in the form of mathematical function, the CPU 410 controls the graphic processor 420 to store all the color and alpha components into the memory 450 as in the conventional approach.

According to the embodiments of the invention described above, the image processing apparatus is able to reduce the memory access load by storing only a part of the image data, i.e., only a color component of the image data, in the memory. In particular, the image processing apparatus and methods improve the efficiency of the image data process using a relatively simple hardware structure for alpha data selection. Moreover, the present invention is advantageous in that the efficiency of image data processing is enhanced without causing distortion of the source image data.

While this invention has been particularly shown and described with references to preferred embodiments thereof, it will be understood by those skilled in the art that various changes in form and details may be made herein without departing from the spirit and scope of the invention as defined by the appended claims.

What is claimed is:

1. An alpha data selector for an image processing apparatus, comprising:
   comparing units, each comparing unit corresponding to one of a plurality of alpha component regions of an image, each comparing unit receiving a positional information signal of alpha component data and information of a current pixel position and generating a comparison signal that indicates whether the current pixel position is included within a corresponding alpha component region; and
   an alpha data output unit generating one of the alpha component data as alpha component data of the current pixel in response to the comparison signals generated by the comparing units,
   wherein the comparing units are arranged to have relative priority and the alpha data output unit selects the alpha component data of the current pixel with reference to the priorities of the comparing units.

2. The alpha data selector as set forth in claim 1, wherein when a first alpha component region having first alpha component data is included in a second alpha component region having second alpha component data, the first alpha component data is selected as alpha component data of the first alpha component region.

3. The alpha data selector as set forth in claim 1, wherein when a first alpha component region having first alpha component data partially overlaps with a second alpha component region having second alpha component data, alpha component data corresponding to an activated region of the first and second alpha component regions is selected as alpha component data of the overlapping region.

4. The alpha data selector as set forth in claim 1, wherein when the alpha component data in a frame can be determined in the form of mathematical function, the alpha component data of the current pixel is output.

5. An image processing apparatus comprising:
   an image processor that processes image data and that outputs color component data of the image data to a memory;
   a control processor that controls operations of the image processor, and that outputs alpha component data of the image data and positional information that represents a distribution profile of alpha component data of the image data, generated by the image processor, when the alpha component data has a predetermined distribution profile;
   an alpha data selector that outputs alpha component data, corresponding to a current pixel position, with reference to the alpha component data and the positional information that are provided by the control processor; and
   a display processor that outputs display image data of the current pixel in response to the color component data retrieved from the memory and the alpha component data received from the alpha data selector.

6. The image processing apparatus as set forth in claim 5, further comprising a bus that transfers the color component data among the memory, the image processor, and the display processor.

7. The image processing apparatus as set forth in claim 5, wherein the display processor provides the current pixel position for the alpha data selector.

8. The image processing apparatus as set forth in claim 7, wherein image data processed in a frame includes at least two different alpha component data.

9. The image processing apparatus as set forth in claim 8, wherein the two different alpha component data are distributed in alpha component regions.

10. The image processing apparatus as set forth in claim 9, wherein the control processor block provides the alpha data selector with positional information of the alpha component data corresponding to the alpha component regions.

11. The image processing apparatus as set forth in claim 10, wherein the alpha data selector sets the first alpha component data as alpha component data of the first alpha component region when a first alpha component region having first alpha component data is included in a second alpha component region having second alpha component data.

12. The alpha data selector as set forth in claim 10, wherein the alpha data selector sets alpha component data corresponding to an activated region of the first and second alpha component regions as alpha component data of the overlapping region when a first alpha component region having first alpha component data partially overlaps with a second alpha component region having second alpha component data.

13. The image processing apparatus as set forth in claim 10, wherein the alpha data selector comprises:
   comparing units, each unit corresponding to one of plurality of alpha component regions of an image, each comparing unit receiving a positional information signal of alpha component data and information of a current pixel position and generating a comparison signal that indicates whether the current pixel position is included within a corresponding alpha component region; and
   an alpha data output unit generating one of the alpha component data as alpha component data of the current pixel in response to the comparison signals generated by the comparing units,
   wherein the comparing units are arranged to have relative priority and the alpha data output unit selects the alpha component data of the current pixel with reference to the priorities of the comparing units.

14. The image processing apparatus as set forth in claim 13, wherein the control processor block provides the comparing units of the alpha data selector with a plurality of positional information of the alpha component data corresponding to the alpha component regions in accordance with priorities.

* * * * *